(12) United States Patent
Fukuda et al.

(10) Patent No.: US 6,844,097 B2
(45) Date of Patent: Jan. 18, 2005

(54) SOLID POLYMER TYPE FUEL CELL

(75) Inventors: Kaoru Fukuda, Wako (JP); Yoichi Asano, Wako (JP); Nagayuki Kanaoka, Wako (JP); Nobuhiro Saito, Wako (JP); Masaaki Nanaumi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 450 days.

(21) Appl. No.: 10/089,077

(22) PCT Filed: Aug. 13, 2001

(86) PCT No.: PCT/JP01/06980

§ 371 (c)(1),
(2), (4) Date: Apr. 10, 2002

(87) PCT Pub. No.: WO02/15313

PCT Pub. Date: Feb. 21, 2002

(65) Prior Publication Data

US 2003/0064268 A1 Apr. 3, 2003

(30) Foreign Application Priority Data

Aug. 11, 2000 (JP) ........................................ 2000-245013
Jan. 19, 2001 (JP) ........................................ 2001-12492
Feb. 20, 2001 (JP) ........................................ 2001-44087

(51) Int. Cl.$^7$ ................................................ H01M 8/10
(52) U.S. Cl. ........................... 429/30; 429/33; 429/40; 429/41; 429/42; 429/302; 429/313
(58) Field of Search .............................. 429/30, 33, 40, 429/41, 42, 302, 313

(56) References Cited

U.S. PATENT DOCUMENTS

| 5,188,768 A | * | 2/1993 | Sotomura | ............... 252/519.34 |
| 6,544,689 B1 | * | 4/2003 | Riley et al. | ................. 429/302 |
| 6,630,265 B1 | * | 10/2003 | Taft et al. | ..................... 429/33 |

FOREIGN PATENT DOCUMENTS

| JP | 5-283094 | 10/1993 |
| JP | 10-334922 | 12/1998 |
| JP | 2000-294260 | 10/2000 |

OTHER PUBLICATIONS

WO 96/12317, published Apr. 25, 1996.

* cited by examiner

*Primary Examiner*—Bruce F. Bell
(74) *Attorney, Agent, or Firm*—Arent Fox PLLC

(57) ABSTRACT

A solid polymer fuel cell (1) has an electrolyte membrane (2), and an air electrode (3) and a fuel electrode (4) that closely contact to opposite sides of the electrolyte membrane (2) respectively. The electrolyte membrane (2) has a membrane core (9) comprising a polymer ion-exchange component, and a plurality of phyllosilicate particles (10) that disperse in the membrane core (9) and are subjected to ion-exchange processing between metal ions and protons, and proton conductance Pc satisfies Pc>0.05 S/cm. Owing to this, it is possible to provide the solid polymer fuel cell equipped with the electrolyte membrane (2) that has excellent high-temperature strength and can improve power-generating performance.

8 Claims, 8 Drawing Sheets

SOLID POLYMER TYPE FUEL CELL

FIELD OF THE INVENTION

The present invention relates to a solid polymer fuel cell.

BACKGROUND ART

In this kind of fuel cell, although an electrolyte membrane is constituted by using a polymer ion-exchange component, it is required that it should have good high-temperature strength since it is used under temperature around 100° C.

Conventionally, such means is adopted that ion-exchange capacity is sacrificed by giving priority to the high-temperature strength of an electrolyte membrane.

However, according to the conventional means, there is a problem that a power-generating performance level cannot but become low because ion-exchange capacity is low.

In a solid polymer fuel cell, a proton moves with entrained water toward an oxygen electrode from a fuel electrode in an electrolyte membrane. Therefore, since the fuel electrode easily becomes dry, there is a possibility that proton conductivity may decrease. On the other hand, when water produced by an electrode reaction becomes excessive on the oxygen electrode, a flooding phenomenon (a phenomenon in which a diffusion path of a gas is blocked by an oxygen electrode getting wet) arises. For this reason, it is necessary to remove moisture on the oxygen electrode while supplying moisture on the fuel electrode.

For such moisture control, (a) a method of humidifying an electrolyte membrane through fiber by making the electrolyte membrane have sandwich structure by sandwiching twisted yarn-formed fiber, and (b) a method (refer to Japanese Patent Application Laid-Open No. 10-334922) of adding a water adsorbent to the fuel electrode etc. are proposed. However, the method (a) has a problem that ion conductivity decreases since the thickness of the electrolyte membrane increases by the fiber, and the method (b) has a problem that the ion-exchange capacity of the fuel electrode and the like decreases by the addition of the water adsorbent.

DISCLOSURE OF THE INVENTION

It is an object of the present invention to provide a solid polymer fuel cell equipped with an electrolyte membrane that has excellent high-temperature strength and does not decrease ion-exchange capacity by high-temperature strength improvement means.

In order to achieve the above-described object, according to the present invention, there is proposed a solid polymer fuel cell including an electrolyte membrane, and an air electrode and a fuel electrode which closely contact to opposite sides of the electrolyte membrane respectively, characterized in that the electrolyte membrane has a membrane core which comprises a polymer ion-exchange component, and a plurality of phyllosilicate particles that disperse in the membrane core and are subjected to ion-exchange processing between metal ions and protons, and proton conductance Pc satisfies Pc>0.05 S/cm.

With the above arrangement, it is possible to increase the high-temperature strength of an electrolyte membrane and to enhance its durability by obtaining particle dispersion strengthening ability based on the phyllosilicate particles.

On the other hand, there is no possibility of lowering the ion-exchange capacity than the case of no addition of phyllosilicate particles even if it makes the particles dispersed in the membrane core since the phyllosilicate particle has peculiar ion-exchange capacity. And the water retention of the electrolyte membrane is enhanced because of the existence of moisture supplied to the membrane core under high-temperature while the protons by the ion-exchange processing exist between layers. Therefore, it is possible to enhance the proton conductance Pc of the electrolyte membrane to Pc>0.05 S/cm as mentioned above.

The electrolyte membrane that has such proton conductance Pc is effective when increasing the power-generating performance of the above-described fuel cell. When the proton conductance Pc satisfies Pc≦0.05 S/cm, an improvement effect of the power-generating performance cannot be expected.

It is an object of the present invention to provide a polyelectrolyte fuel cell in which low humidification operation is possible without increasing the thickness of the electrolyte membrane and decreasing the ion-exchange capacity of the fuel electrode and the like.

In order to achieve the above-described object, according to the present invention, there is proposed a solid polymer fuel cell which has an electrolyte membrane, and an air electrode and a fuel electrode which closely contact to opposite sides of the electrolyte membrane respectively, characterized in that the air electrode and fuel electrode have a plurality of catalytic particles, a polymer ion-exchange component, and a plurality of phyllosilicate particles.

With such arrangement, it is possible to provide the solid polymer fuel cell in which low humidification operation is possible without lowering the power-generating performance.

BEST MODE FOR CARRYING OUT THE INVENTION

[Embodiment I]

Figure 1:
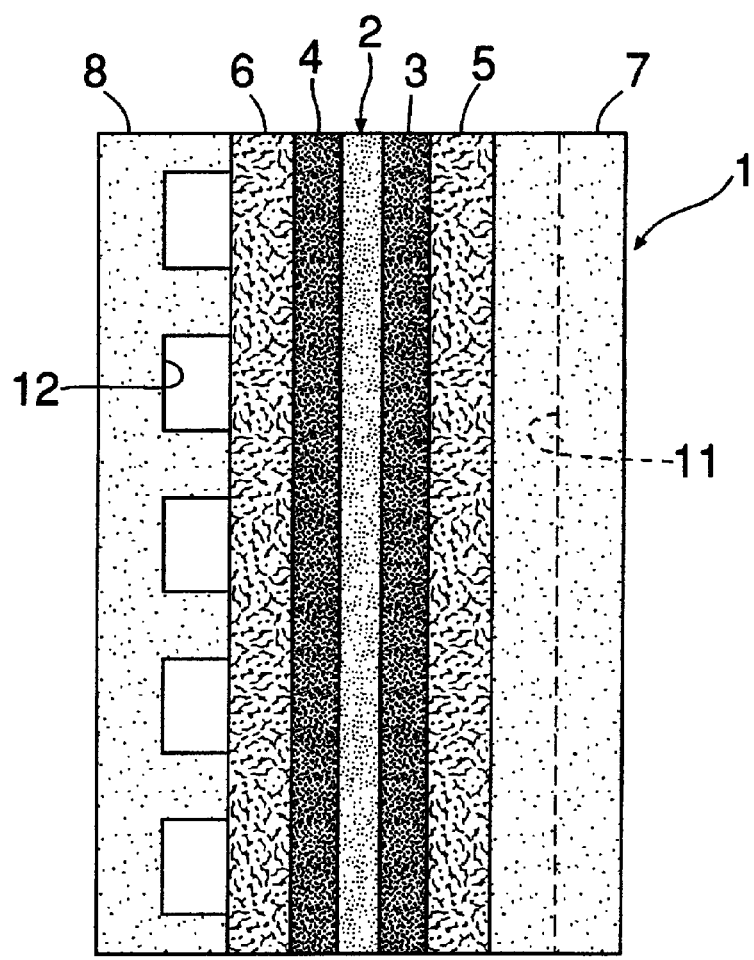
FIG. 1 is a schematic side view of a solid polymer fuel cell.

In FIG. 1, a solid polymer fuel cell (cell) 1 comprises an electrolyte membrane 2, an air electrode 3 and a fuel electrode 4 which closely contact to opposite sides thereof respectively, a pair of diffusion layers 5 and 6 that closely contact to both of those electrodes 3 and 4 respectively, and a pair of separators 7 and 8 that closely contact to both of those diffusion layers 5 and 6.

Figure 2:
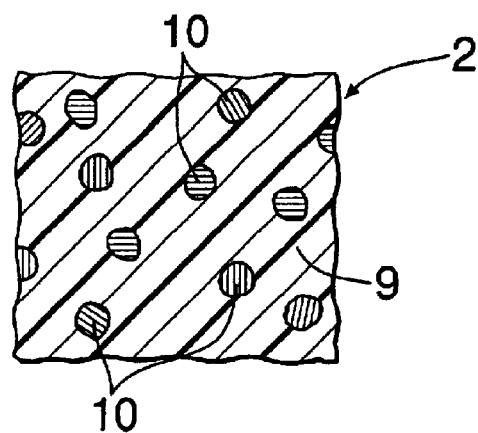
FIG. 2 is an exploded sectional view of an essential part of an electrolyte membrane.

As shown in FIG. 2, the electrolyte membrane 2 comprises a membrane core 9 comprising a polymer ion-exchange component, for example, an aromatic hydrocarbons polymer ion-exchange component, and a plurality of phyllosilicate particles 10 that disperses in the membrane core 9 and is subjected to the ion-exchange processing between metal ions and protons, and has such a characteristic that proton conductance Pc is Pc>0.05 S/cm. The air electrode 3 and fuel electrode 4 comprise a plurality of catalyst particles where a plurality of Pt particles are supported on each surface of carbon black particles, and, for example, a proton conductive binder.

Each of the diffusion layers 5 and 6 has porous carbon paper, a carbon plate, etc., and, each of the separators 7 and 8 comprises graphitized carbon, for example, so that it may have the same form. Air is supplied into a plurality of grooves 11 existing in the separator 7 in the side of the air electrode 3, and hydrogen is supplied into a plurality of grooves 12 that exists in the separator 8 in the side of the fuel electrode 4 and intersects the above-described grooves 11, respectively.

The aromatic hydrocarbons polymer ion-exchange component has the characteristics that it is a non-fluorine and is soluble in a solvent. As this kind of polymer ion-exchange components, the various ion exchangers mentioned in Table 1 are used.

TABLE 1

| Polymer Ion-exchange component | Matrix | Substituent of Benzene ring of Matrix with H-Atom |
|---|---|---|
| Example 1 | Polyether ether ketone (PEEK) | Sulfonic group |
| Example 2 | Polyethersulfone (PES) | |
| Example 3 | Polysulfone (PSF) | |
| Example 4 | Polyetherimide (PEI) | |
| Example 5 | Polyphenylene sulfide (PPS) | |
| Example 6 | Polyphenylene oxide (PPO) | |

Various polar solvents mentioned in Table 2 are used as a solvent.

TABLE 2

| Polar Solvent | Boiling Point |
|---|---|
| Dimethyl acetamide (DMAc) | 165.5° C. |
| Dimethyl formamide (DMF) | 153° C. |
| Dimethyl sulfoxide (DMSO) | 189° C. |
| Triethyl phosphate (TEP) | 115° C. |
| N-methyl pyrolidone (NMP) | 202° C. |

As the phyllosilicate particles 10, particles of smectite minerals such as montmorillonite $[M_{0.33}Si_4(Mg_{0.33}Al_{1.67})O_{10}(OH)_2 \cdot nH_2O; M:Na]$, saponite $[M_{0.33}(Si_{3.67}Al_{0.33})Mg_3O_{10}(OH)_2 \cdot nH_2O; M:Na]$, hectorite $[M_{0.33}Si_4(Mg_{2.67}Li_{0.33})O_{10}(OH)_2 \cdot nH_2O; M:Na]$, stevensite $[M_{0.17}Si_4Mg_{2.92}O_{10}(OH)_2 \cdot nH_2O; M:Na]$, and vermiculite $[M_{0.86}(Al_{0.86}Si_{3.14})Al_2O_{10}(OH)_2 \cdot nH_2O; M:Na]$ are used, and in addition to them, particles of synthetic mica such as fluorotetrasilicic mica $[M \cdot Mg_{2.5}(Si_4O_{10})F_2; M:Na]$, and teniolite $[M \cdot Mg_2(Si_4O_{10})F_2; M:Na, Li]$ are also used. When using each of phyllosilicate particles 10, the particles 10 are soaked in an inorganic acid to ion exchange interlayer metal ions such as Na ions, and Li ions for protons. As the inorganic acid, a hydrochloric acid, a sulfuric acid, a nitric acid, or the like is used.

When constituting the electrolyte membrane 2 as mentioned above, it is possible to increase the high-temperature strength of the electrolyte membrane 2 and to enhance its durability, by obtaining particle dispersion strengthening ability based on the phyllosilicate particles 10.

On the other hand, there is no possibility of lowering the ion-exchange capacity than the case of no addition of phyllosilicate particles 10 even if this is made to be dispersed in the membrane core 9 since the phyllosilicate particle 10 has peculiar ion-exchange capacity. And the water retention of the electrolyte membrane 2 is enhanced because of the existence of moisture supplied to the membrane core 9 under high-temperature while the protons by the above-described ion-exchange processing exist between layers. Therefore, it is possible to enhance the proton conductance Pc of the electrolyte membrane 2 to Pc>0.05 S/cm as mentioned above.

The electrolyte membrane 2 that has such proton conductance Pc is effective when increasing the power-generating performance of the above-described fuel cell.

It is necessary that the particle size d of the phyllosilicate particle 10 satisfies $0.001 \ \mu m \leq d \leq 2 \ \mu m$, and, the ion-exchange capacity Ic satisfies $0.5 \ meq/g \leq Ic \leq 2.0 \ meq/g$ and the particle content L in the electrolyte membrane 2 satisfies $L \leq 10\%$ by weight. It becomes possible to enhance the high-temperature strength of the electrolyte membrane 2, and to increase the proton conductance Pc to Pc>0.05 S/cm, by combining these three requirements with the above-described ion-exchange processing. Nevertheless, if the particle size d satisfies $d > 2 \ \mu m$ or the ion-exchange capacity Ic satisfies $Ic < 0.5 \ meq/g$, the ion-exchange capacity Ic of the electrolyte membrane 2 decreases rather than the case of no addition of the phyllosilicate particles. In addition, if the particle size d satisfies $d < 0.001 \ \mu m$ or the ion-exchange capacity Ic satisfies $Ic > 2.0 \ meq/g$, it is not possible to obtain a stable dispersion status, and the water retention cannot be expected. If the particle content L satisfies $L > 10\%$ by weight, the proton conductance Pc of the electrolyte membrane 2 is lowered rather than the case of no addition of the phyllosilicate particles.

Hereafter, specific examples will be described.

EXAMPLE I a. Production of Electrolyte Membrane

EXAMPLE-1

An integrated-material of the hectorite particles 10 whose particle size d satisfied $d \leq 2 \ \mu m$ and whose ion-exchange capacity Ic satisfied Ic=0.5 meq/g was soaked in a 0.1-N hydrochloric acid to be subjected to ion-exchange processing. In this case, the ion exchange of interlayer Na ions of the hectorite particles 10 is performed for protons.

As an aromatic hydrocarbons polymer ion-exchange component, Example 1 (sulfonated PEEK) in Table 1 was prepared, and dissolved under reflux in NMP in Table 2. The content of the polymer ion-exchange component in this solution is 10% by weight.

The hectorite particles 10 after the ion-exchange processing were added in a solution containing this polymer ion-exchange component so that its content L may become L=0.5% by weight in the electrolyte membrane 2, and the film forming material was prepared. The electrolyte membrane 2 with the thickness of 50 $\mu$m was formed by using this membrane forming material. This electrolyte membrane 2 is referred to as Example (1).

EXAMPLE-2

The electrolyte membrane 2 with the same thickness as that of Example (1) was formed with the same method as that of Example-1 except the content L of the hectorite particles 10 after the ion-exchange processing being set at L=1% by weight. This electrolyte membrane 2 is referred to as Example (2).

EXAMPLE-3

The electrolyte membrane 2 with the same thickness as that of Example (1) was formed with the same method as that of Example-1 except the content L of the hectorite particles 10 after the ion-exchange processing being set at L=3% by weight. This electrolyte membrane 2 is referred to as Example (3).

EXAMPLE-4

The electrolyte membrane 2 with the same thickness as that of Example (1) was formed with the same method as that of Example-1 except the content L of the hectorite particles 10 after the ion-exchange processing being set at L=6% by weight. This electrolyte membrane 2 is referred to as Example (4).

EXAMPLE-5

The electrolyte membrane 2 with the same thickness as that of Example (1) was formed with the same method as that of Example-1 except the content L of the hectorite particles 10 after the ion-exchange processing being set at L=9% by weight. This electrolyte membrane 2 is referred to as Example (5).

EXAMPLE-6

The electrolyte membrane 2 with the same thickness as that of Example (1) was formed with the same method as that of Example-1 except the saponite particles 10 with the ion-exchange capacity Ic of 0.7 meq/g being used and the content L of the saponite particles 10 after the ion-exchange processing being set at L=6% by weight. This electrolyte membrane 2 is referred to as Example (6).

EXAMPLE-7

The electrolyte membrane 2 with the same thickness as that of Example (1) was formed with the same method as that of Example-1 except the montmorillonite particles 10 with the ion-exchange capacity Ic of 1.2 meq/g being used and the content L of the montmorillonite particles 10 after the ion-exchange processing being set at L=6% by weight. This electrolyte membrane 2 is referred to as Example (7).

EXAMPLE-8

The electrolyte membrane 2 with the same thickness as that of Example (1) was formed with the same method as that of Example-1 except the teniolite particles 10 with the ion-exchange capacity Ic of 2 meq/g being used and the content L of the teniolite particles 10 after the ion-exchange processing being set at L=6% by weight. This electrolyte membrane 2 is referred to as Example (8).

EXAMPLE-9

The electrolyte membrane 2 with the same thickness as that of Example (1) was formed with the same method as that of Example-1 except the content L of the hectorite particles 10 after the ion-exchange processing being set at L=10% by weight. This electrolyte membrane 2 is referred to as Example (9).

EXAMPLE-10

The electrolyte membrane 2 with the same thickness as that of Example (1) was formed with the same method as that of Example-1 except the content L of the hectorite particles 10 after the ion-exchange processing being set at L=12% by weight. This electrolyte membrane 2 is referred to as Example (10).

EXAMPLE-11

The electrolyte membrane 2 with the same thickness as that of Example (1) was formed with the same method as that of Example-1 except the hectorite particles 10 without the ion-exchange processing being used and the content L of the hectorite particles 10 being set at L=6% by weight. This electrolyte membrane 2 is referred to as Example (11).

EXAMPLE-12

The electrolyte membrane 2 with the same thickness as that of Example (1) was formed with the same method as that of Example-1 except the hectorite particles 10, whose particle diameter d was $d \leq 3 \mu m$, being used and the content L of the hectorite particles 10 after ion-exchange processing being set at L=6% by weight. This electrolyte membrane 2 is referred to as Example (12).

EXAMPLE-13

The electrolyte membrane 2 with the same thickness as that of Example (1) was formed with the same method as that of Example-1 except the montmorillonite particles 10 with the ion-exchange capacity Ic of 1.2 meq/g without the ion-exchange processing being used and the content L of the montmorillonite particles 10 being set at L=6% by weight. This electrolyte membrane 2 is referred to as Example (13).

EXAMPLE-14

The electrolyte membrane 2 with the same thickness as that of Example (1) was formed with the same method as that of Example-1 except the teniolite particles 10 with the ion-exchange capacity Ic of 2 meq/g without the ion-exchange processing being used and the content L of the teniolite particles 10 being set at L=6% by weight. This electrolyte membrane 2 is referred to as Example (14).

b. Production of Electrolyte Membrane-electrode Integrated-material

The catalyst particles were prepared by a plurality of Pt particles being supported on the carbon black particles. The content of the Pt particles in the catalyst particles is 45% by weight. In addition, base layers comprising PTFE and carbon particles were formed in one sides of a plurality of porous carbon paper to obtain a plurality of diffusion layers 5 and 6. Furthermore, Nafion (made by E. I. du Pont de Nemours & Co.) was dissolved in a mixed solvent that consists of isopropyl alcohol and n-propyl alcohol, and a binder solution with proton conductivity was prepared. The content of Nafion in this solution is 5% by weight.

In the above-described binder solution, catalyst particles were mixed so as to be Nafion:catalyst particle=1.25:2 by weight ratio, and subsequently, the dispersion of the catalyst particles was intended by using a ball mill so that paste for the air electrode 3 and fuel electrode 4 was prepared. This paste was applied by screen printing on each base layer of the diffusion layers 5 and 6 so that an amount of Pt might become 0.5 mg/cm$^2$, and subsequently, drying for 10 minutes was performed at 60° C., and after that, reduced pressure drying was performed at 120° C. to obtain the air electrode 3 and fuel electrode 4. In Example (1) of the electrolyte membrane 2, an electrolyte membrane-electrode integrated-material was obtained by performing hot press under conditions of 150° C., 2.5 MPa, and 1 minute with contacting the one diffusion layer 5 to one face of the electrolyte membrane 2 through the air electrode 3 and contacting another diffusion layer 6 to another face through the fuel electrode 4.

With the same method as described above, 14 kinds of electrolyte membrane-electrode integrated-materials were manufactured by using reference examples (phyllosilicate particles were not contained) of the electrolyte membrane 2 that were Examples (2) to (14).

C. Measurement of Ion-exchange Capacity Ic, Proton Conductance Pc, Film Thickness Retention Rt, and Water Content Wc of Electrolyte Membrane, and Measurement of Power Generation Potential of Fuel Cell A titrimetric method is applied in the measurement of ion-exchange capacity, and in the measurement of proton conductance Pc, a two-terminal method was applied in a thermo-hygrostat by using an impedance analyzer (trade name: Solartron SI 1260).

The following means was adopted in measurement of the film thickness retention Rt. That is, in an environment of the temperature of 135° C. and the humidity of 90%, a creep test in which the electrolyte membrane 2 was left at the planar pressure of 0.8 MPa for 200 hours was performed, subsequently, the electrolyte membrane 2 was cut, membrane thickness was measured under a microscope, and after that, with referring to thickness before the test as t1 and referring to thickness after the test as t2, membrane thickness retention Rt=(t2/t1)×100 (%) was calculated.

The following means was adopted in the measurement of the water content Wc. Namely, after soaking the electrolyte membrane 2 in hot water of 90° C., the weight w1 of the electrolyte membrane 2 was measured at room temperature, subsequently, the electrolyte membrane 2 was retained in a thermal environment of 110° C. made to be in a vacuum, and after that, the weight w2 of the electrolyte membrane 2 was measured. Then, the moisture content w3 was calcualted as w3=w1−w2, and subsequently, water content Wc=(w3/w1)×100 (%) was calculated.

In the measurement of generation potential of the fuel cell, the fuel cell was assembled by using each electrolyte membrane-electrode integrated-material, potential (V) at the current density of 0.2 A/cm$^2$ was measured for each fuel cell under conditions of anode gas:pure hydrogen; cathode gas:air; 100 kPa of pressure, 50% of utilization actor, and 50% of relative humidity of both gases, and 85° C. of operating temperatures of the fuel cell.

d. Measurement Result

Specifications of the phyllosilicate particle 10, various measurements of the electrolyte membrane 2, and power generation potential of the fuel cell that relate to Examples (1) to (14) are summarized in Table 3. In the table, a reference example is Example 1 in Table 1, i.e., an electrolyte membrane which consists only of a sulfonated PEEK material, and a Pc index shows a rising degree of the proton conductance Pc such as an example (1) to the proton conductance Pc of the reference example.

TABLE 3

| Electrolyte membrane | Phyllosilicate Particle | | | | | Electrolyte membrane | | | | | Power Generation Potential of Fuel Cell (V) |
|---|---|---|---|---|---|---|---|---|---|---|---|
| | Kind of Phyllo-silicate | Ion-exchange capacity Ic (meq/g) | Particle Size d (μm) | Presence of Ion-exchange processing | Particle Content L (% by weight) | Ion-exchange capacity Ic (meq/g) | Proton Conductance Pc (S/cm) | Pc Index (Pc/0.05) | Membrane Thickness Retention Rt (%) | Water Content Wc (%) | |
| Reference Example | — | — | — | — | — | 1.23 | 0.050 | 1.00 | 72.5 | 54 | 0.66 |
| Example (1) | Hectorite | 0.5 | ≦2 | Yes | 0.5 | 1.24 | 0.052 | 1.04 | 75.2 | 56.7 | 0.70 |
| Example (2) | Hectorite | 0.5 | ≦2 | Yes | 1 | 1.24 | 0.053 | 1.06 | 77.5 | 58.1 | 0.70 |
| Example (3) | Hectorite | 0.5 | ≦2 | Yes | 3 | 1.23 | 0.057 | 1.14 | 79.8 | 62.1 | 0.70 |
| Example (4) | Hectorite | 0.5 | ≦2 | Yes | 6 | 1.24 | 0.058 | 1.16 | 87.2 | 67.5 | 0.70 |
| Example (5) | Hectorite | 0.5 | ≦2 | Yes | 9 | 1.23 | 0.054 | 1.08 | 90.6 | 71.6 | 0.70 |
| Example (6) | Saponite | 0.7 | ≦2 | Yes | 6 | 1.25 | 0.061 | 1.22 | 87.3 | 64.8 | 0.71 |
| Example (7) | Montmorillonite | 1.2 | ≦2 | Yes | 6 | 1.26 | 0.066 | 1.32 | 86.9 | 63.5 | 0.75 |
| Example (8) | Teniolite | 2 | ≦2 | Yes | 6 | 1.28 | 0.069 | 1.38 | 87.5 | 64.1 | 0.75 |
| Example (9) | Hectorite | 0.5 | ≦2 | Yes | 10 | 1.26 | 0.051 | 1.02 | 91.2 | 72.9 | 0.70 |
| Example (10) | Hectorite | 0.5 | ≦2 | Yes | 12 | 1.23 | 0.043 | 0.86 | 91.5 | 75.6 | 0.62 |
| Example (11) | Hectorite | 0.5 | ≦2 | No | 6 | 1.19 | 0.049 | 0.98 | 87.1 | 64.1 | 0.63 |
| Example (12) | Hectorite | 0.5 | ≦3 | Yes | 6 | 1.22 | 0.047 | 0.94 | 87.4 | 64.1 | 0.62 |
| Example (13) | Montmorillonite | 1.2 | ≦2 | No | 6 | 1.11 | 0.049 | 0.98 | 87.2 | 62.8 | 0.63 |

TABLE 3-continued

| | Phyllosilicate Particle | | | | Electrolyte membrane | | | | | Power |
|---|---|---|---|---|---|---|---|---|---|---|
| Electrolyte membrane | Kind of Phyllo-silicate | Ion-exchange capacity Ic (meq/g) | Particle Size d (μm) | Presence of Ion-exchange processing | Particle Content L (% by weight) | Ion-exchange capacity Ic (meq/g) | Proton Conductance Pc (S/cm) | Pc Index (Pc/0.05) | Membrane Thickness Retention Rt (%) | Water Content Wc (%) | Generation Potential of Fuel Cell (V) |
| Example (14) | Teniolite | 2 | ≦2 | No | 6 | 1.03 | 0.048 | 0.96 | 86.5 | 63.5 | 0.62 |

Figure 3:
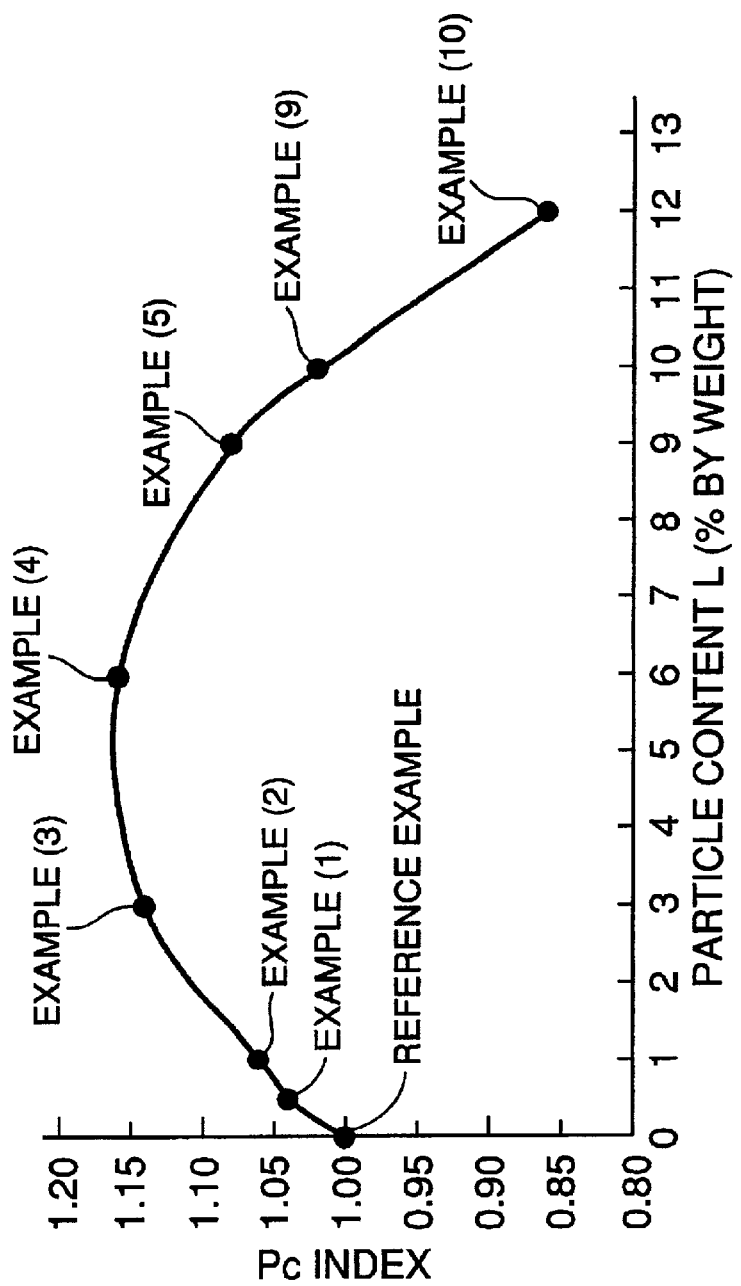
FIG. 3 is a graph showing the relationship between the particle content L and the Pc index.

FIG. 3 is a graph of the relationship between the particle content L and the Pc index in regard to the reference example, and Examples (1) to (5), (9), and (10) on the basis of Table 3. As apparent from Table 3 and FIG. 3, it is possible to increase the proton conductance PC rather than that of the reference example by setting the particle content L at L≦10% by weight.

Figure 4:
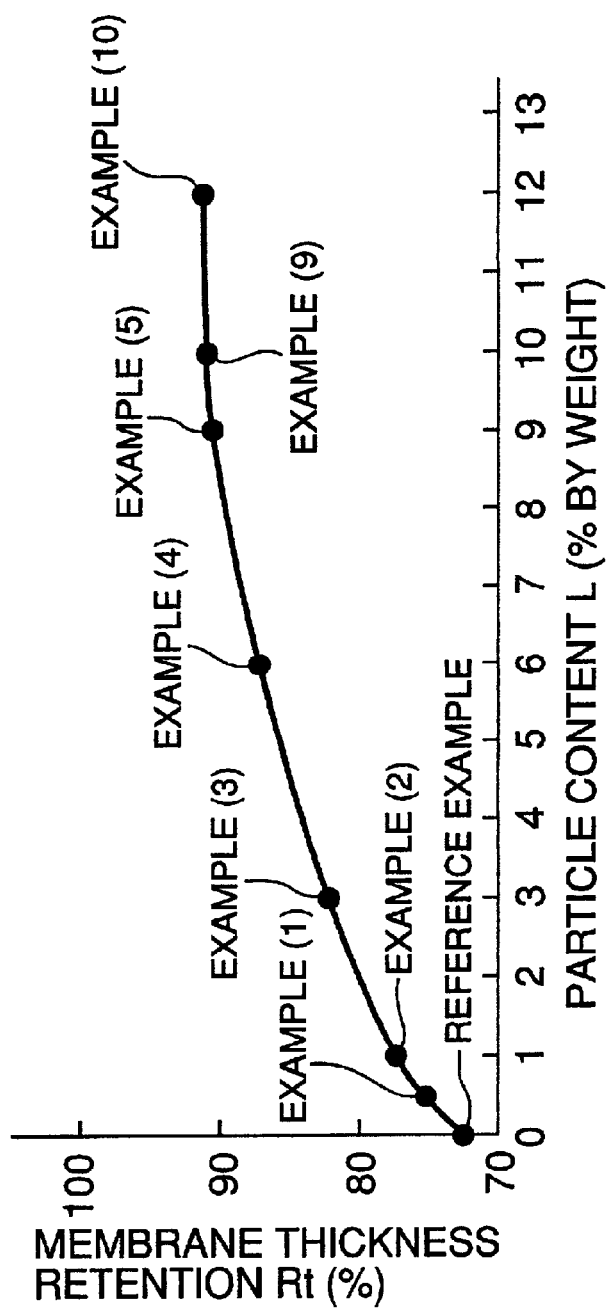
FIG. 4 is a graph showing the relationship between the particle content L and the film thickness retention Rt.

FIG. 4 is a graph of the relationship between the particle content L and the membrane thickness retention Rt in regard to the reference example, and Examples (1) to (5), (9), and (10) on the basis of Table 3. As apparent from Table 3 and FIG. 4, if the phyllosilicate particles 10 are contained, it becomes possible to increase the high-temperature strength rather than that of the reference example that does not contain it.

Figure 5:
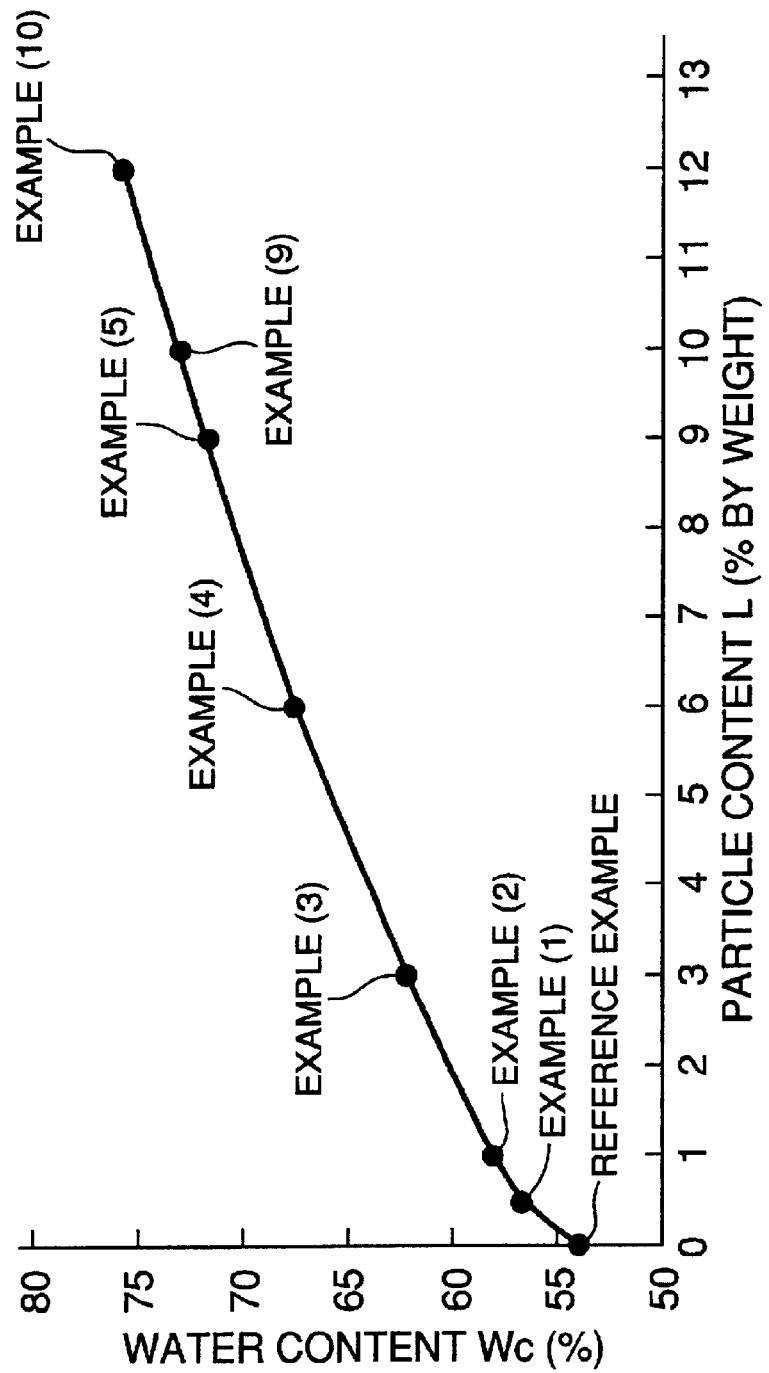
FIG. 5 is a graph showing the relationship between the particle content L and the water content Wc.

FIG. 5 is a graph of the relationship between the particle content L and the water content Wc in regard to the reference example, and Examples (1) to (5), (9), and (10) on the basis of Table 3. As apparent from Table 3 and FIG. 5, if the phyllosilicate particles 10 are contained, it becomes possible to increase the water content Wc rather than that of the reference example that does not contain it.

Figure 6:
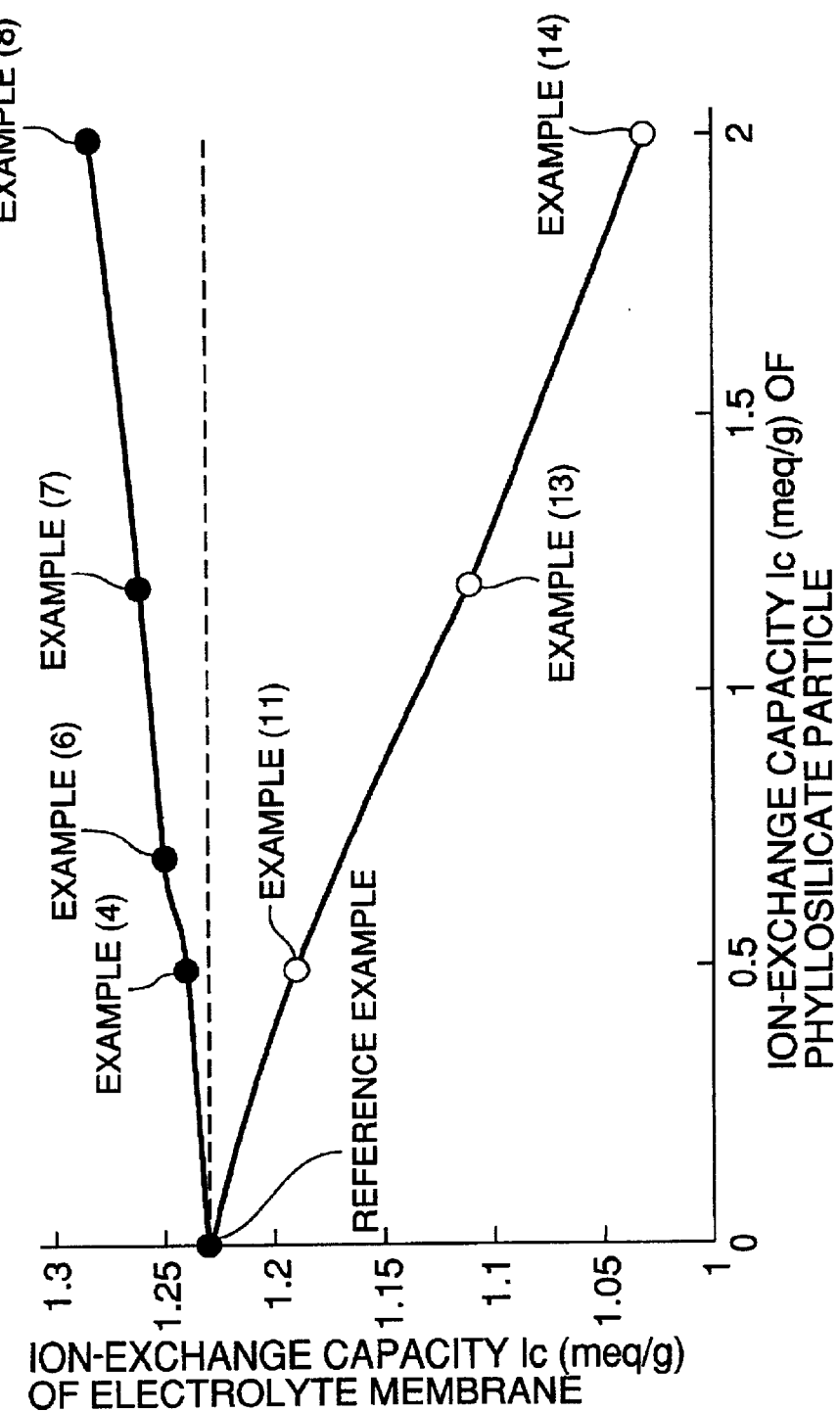
FIG. 6 is a graph showing the relationship between the ion-exchange capacity Ic of phyllosilicate particles and the ion-exchange capacity Ic of an electrolyte membrane.

FIG. 6 is a graph of the relationship between the ion-exchange capacity Ic of the phyllosilicate particles 10 and the ion-exchange capacity Ic of the electrolyte membrane 2 in regard to the reference example and Examples (4), (6) to (8), (11), (13), and (14) whose particle contents L satisfies L=6% by weight, on the basis of Table 3. As apparent from Table 3 and FIG. 6, it can be seen that the ion-exchange capacity of Examples (4), and (6) to (8) where the phyllosilicate particles 10 ion-exchanged are used increases rather than that of Examples (11), (13), and (14) that use the phyllosilicate particles 10 without acid treatment. Thereby, the significance of the ion-exchange processing is clear. In order to obtain the effect by this acid treatment, it is necessary that the ion-exchange capacity Ic of the phyllosilicate particles 10 satisfies Ic≧20.5 meq/g.

In addition, when comparing Example (4) with Example (12) in Table 3, it is apparent that it is necessary to set the particle size d of the phyllosilicate particle 10 to d≦2 μm in increasing the characteristics of the electrolyte membrane 2.

It is apparent from Table 3 that the fuel cell using Examples (1) to (9) of the electrolyte membranes that have the above characteristics has the power-generating performance superior to those using the reference example and Examples (10) to (14). In the above-described fuel cell operating conditions, that the relative humidity of pure hydrogen and air was especially set at 50% means that power generation was performed in a dry state, and the reason why the power-generating performance which was excellent as mentioned above can be obtained under such conditions is that the electrolyte membrane 2 has yet sufficient water retention under a high temperature.

EXAMPLE II a. Production of Electrolyte Membrane

EXAMPLE-1

An integrated material of the montmorillonite particles 10 whose particle size d satisfied d≦2 μm and whose ion-exchange capacity Ic was Ic=1.09 meq/g was soaked in a 0.1-N hydrochloric acid to be subjected to ion-exchange processing. In this case, the ion exchange of interlayer Na ions of the montmorillonite particles 10 is performed for protons.

As an aromatic hydrocarbons polymer ion-exchange component, Example 1 (sulfonated PEEK material) in Table 1 was prepared, and dissolved under reflux in NMP in Table 2. The content of the polymer ion-exchange component in this solution is 10% by weight.

The montmorillonite particles 10 after the ion-exchange processing were added in a solution containing this polymer ion-exchange component so that its content L may become L=6% by weight in the electrolyte membrane 2, and the membrane forming material was prepared. The electrolyte membrane 2 with the thickness of 50 μm was formed by using this membrane forming material. This electrolyte membrane 2 is referred to as Example (15).

EXAMPLE-2

The electrolyte membrane 2 with the same thickness as that of Example (15) was formed with the same method as that of Example-1 except the montmorillonite particles 10 with the ion-exchange capacity Ic of 1.07 meq/g being used. This electrolyte membrane 2 is referred to as Example (16).

EXAMPLE-3

The electrolyte membrane 2 with the same thickness as that of Example (15) was formed with the same method as that of Example-1 except the montmorillonite particles 10 with the ion-exchange capacity Ic of 0.91 meq/g being used. This electrolyte membrane 2 is referred to as Example (17).

EXAMPLE-4

The electrolyte membrane 2 with the same thickness as that of Example (15) was formed with the same method as that of Example-1 except the saponite particles 10 with the ion-exchange capacity Ic of 0.71 meq/g being used. This electrolyte membrane 2 is referred to as Example (18).

EXAMPLE-5

The electrolyte membrane 2 with the same thickness as that of Example (15) was formed with the same method as that of Example-1 except the hectorite particles 10 with the ion-exchange capacity Ic of 0.50 meq/g being used. This electrolyte membrane 2 is referred to as Example (19).

EXAMPLE-6

The electrolyte membrane 2 with the same thickness as that of Example (15) was formed with the same method as that of Example-1 except the hectorite particles 10 with the ion-exchange capacity Ic of 1.00 meq/g being used. This electrolyte membrane 2 is referred to as Example (20).

EXAMPLE-7

The electrolyte membrane 2 with the same thickness as that of Example (15) was formed with the same method as that of Example-1 except the stevensite particles 10 with the ion-exchange capacity Ic of 0.54 meq/g being used. This electrolyte membrane 2 is referred to as Example (21).

EXAMPLE-8

The electrolyte membrane 2 with the same thickness as that of Example (15) was formed with the same method as that of Example-1 except the vermiculite particles 10 with the ion-exchange capacity Ic of 1.25 meq/g being used. This electrolyte membrane 2 is referred to as Example (22).

EXAMPLE-9

The electrolyte membrane 2 with the same thickness as that of Example (15) was formed with the same method as that of Example-1 except the fluorotetrasilicic mica particles 10 with the ion-exchange capacity Ic of 1.20 meq/g being used. This electrolyte membrane 2 is referred to as Example (23).

EXAMPLE-10

The electrolyte membrane 2 with the same thickness as that of Example (15) was formed with the same method as that of Example-1 except the fluorotetrasilicic mica particles 10 with the ion-exchange capacity Ic of 0.60 meq/g being used. This electrolyte membrane 2 is referred to as Example (24).

EXAMPLE-11

The electrolyte membrane 2 with the same thickness as that of Example (15) was formed with the same method as that of Example-1 except the kaolinite particles 10 with the ion-exchange capacity Ic of 0.06 meq/g being used. This electrolyte membrane 2 is referred to as Example.

EXAMPLE-12

The electrolyte membrane 2 with the same thickness as that of Example (15) was formed with the same method as that of Example-1 except the halloysite particles 10 with the ion-exchange capacity Ic of 0.20 meq/g being used. This electrolyte membrane 2 is referred to as Example (26).

EXAMPLE-13

The electrolyte membrane 2 with the same thickness as that of Example (15) was formed with the same method as that of Example-1 except the chlorite particles 10 with the ion-exchange capacity Ic of 0.05 meq/g being used. This electrolyte membrane 2 is referred to as Example (27).

EXAMPLE-14

The electrolyte membrane 2 with the same thickness as that of Example (15) was formed with the same method as that of Example-1 except the illite particles 10 with the ion-exchange capacity Ic of 0.12 meq/g being used. This electrolyte membrane 2 is referred to as Example (28).

b. Production of Electrolyte Membrane-electrode Integrated-material

Fourteen kinds of electrolyte membrane-electrode integrated-materials were produced by the same method as Example I by using Examples (15) to (28) of the electrolyte membrane 2.

c. Measurement of Ion-exchange Capacity Ic, Proton Conductance Pc, and Dehydration Temperature-rising Value $\Delta T$ of Electrolyte Membrane, and Measurement of Power Generation Potential of Fuel Cell The measurement of these ion-exchange capacity, proton conductance Pc, and power generation potential was performed by the same method as that of EXAMPLE I.

The following means was adopted in measurement of the dehydration temperature-rising value $\Delta T$. First, as the preparation of a sample, vacuum drying processing at 50° C. for 12 hours was performed for the reference example and Examples (15) to (28) of the electrolyte membrane 2 in Table 3. Subsequently, both samples of the reference example and Example (15) were installed in a differential scanning calorimeter (DSC made by SEIKO electronic Co., Ltd.), temperature T1 relating to the sample of the reference example at the time of the maximum calorie generation accompanying dehydration and temperature T2 relating to the sample of Example (15) were obtained at the temperature-rising speed of 5° C./min, and after that, $T2-T1=\Delta T$ is calculated to refer to this $\Delta T$ as the dehydration temperature-rising value of Example (15). Similar measurements are conducted for Examples (16) to (28).

d. Measurement Result

Specifications of the phyllosilicate particle 10, various measurements of the electrolyte membrane 2, and power generation potential of the fuel cell that relate to Examples (15) to (28) are summarized in Table 4.

TABLE 4

| | | Phyllosilicate Particle | | | | Electrolyte membrane | | | |
|---|---|---|---|---|---|---|---|---|---|
| Electrolyte membrane | Kind of Phyllosilicate | Ion-exchange capacity Ic (meq/g) | Particle Size d (μm) | Presence of Ion-exchange processing | Particle Content L (% by weight) | Ion-exchange capacity Ic (meq/g) | Proton Conductance Pc (S/cm) | Dehydration Temperature-Rising Value ΔT (° C.) | Power Generation Potential of Fuel Cell (V) |
| Example (15) | Montmorillonite | 1.09 | ≦2 | Yes | 6 | 1.26 | 0.066 | 10 | 0.75 |
| Example (16) | | 1.07 | ≦2 | Yes | 6 | 1.26 | 0.065 | 9 | 0.75 |
| Example (17) | | 0.91 | ≦2 | Yes | 6 | 1.25 | 0.062 | 8 | 0.73 |
| Example (18) | Saponite | 0.71 | ≦2 | Yes | 6 | 1.25 | 0.061 | 5 | 0.71 |
| Example (19) | Hectorite | 0.50 | ≦2 | Yes | 6 | 1.24 | 0.058 | 8 | 0.70 |

TABLE 4-continued

| | Phyllosilicate Particle | | | | | Electrolyte membrane | | | |
|---|---|---|---|---|---|---|---|---|---|
| Electrolyte membrane | Kind of Phyllosilicate | Ion-exchange capacity Ic (meq/g) | Particle Size d (μm) | Presence of Ion-exchange processing | Particle Content L (% by weight) | Ion-exchange capacity Ic (meq/g) | Proton Conductance Pc (S/cm) | Dehydration Temperature-Rising Value ΔT (° C.) | Power Generation Potential of Fuel Cell (V) |
| Example (20) | | 1.00 | ≦2 | Yes | 6 | 1.25 | 0.063 | 10 | 0.75 |
| Example (21) | Stevensite | 0.54 | ≦2 | Yes | 6 | 1.24 | 0.059 | 5 | 0.71 |
| Example (22) | Vermiculite | 1.25 | ≦2 | Yes | 6 | 1.27 | 0.062 | 8 | 0.73 |
| Example (23) | Fluorotetrasilicic mica | 1.20 | ≦2 | Yes | 6 | 1.26 | 0.060 | 9 | 0.72 |
| Example (24) | | 0.60 | ≦2 | Yes | 6 | 1.24 | 0.052 | 6 | 0.70 |
| Example (25) | Kaolinite | 0.06 | ≦2 | Yes | 6 | 0.99 | 0.039 | 0 | 0.61 |
| Example (26) | Halloysite | 0.20 | ≦2 | Yes | 6 | 1.01 | 0.042 | 0 | 0.61 |
| Example (27) | Chlorite | 0.05 | ≦2 | Yes | 6 | 0.99 | 0.039 | 1 | 0.60 |
| Example (28) | Illite | 0.12 | ≦2 | Yes | 6 | 1.02 | 0.041 | 1 | 0.62 |

As apparent from Table 4, it can be seen that Examples (15) to (24) contribute to the improvement in the power-generating performance of the fuel cell conjointly with having high proton conductance since the dehydration temperature-rising value ΔT is high and hence the excellent water retention is demonstrated at the operating temperature of the fuel cell of 85° C.

[Embodiment II]

In the solid polymer fuel cell 1 shown in FIG. 1, as a polymer ion-exchange component of the electrolyte membrane 2, besides those mentioned in Table 1, a sulfonic acid radical-containing resin of a non-fluorine system such as a sulfonated phenoxybenzophenone-benzophenone copolymer, and sulfonated perfluorocarbon can be also used.

The diffusion layers 5 and 6 have not only a function of transmitting electrons between the air electrode 3 and fuel electrode 4, and separators 7 and 8, but also a function of diffusing a fuel gas (hydrogen) and an oxidizer gas (air) to supply them to the air electrode 3 and fuel electrode 4. Therefore, the diffusion layers 5 and 6 need to have both conductivity and porosity. Specifically, in regard to diffusion layers 5 and 6, it is preferable to form a base layer by applying slurry of an ion conductive binder (this may be also the above-described polymer ion-exchange component), where carbon black is dispersed, on a supporting layer (charge collector) such as carbon paper, carbon cloth, and carbon felt.

In addition, the air electrode 3 and fuel electrode 4 can be obtained by applying slurry for electrodes to the diffusion layers 5 and 6, the slurry being obtained by uniformly dispersing catalyst particle and phyllosilicate particles in an organic solvent solution of an ion conductive binder (polymer ion-exchange component), the catalyst particle being formed by supporting catalyst metal particles such as Pt particles on carrier particles such as carbon black particles.

The characteristic of this embodiment is the addition of a plurality of phyllosilicate particles so as to give a water retention effect to the air electrode 3 and fuel electrode 4. Since the phyllosilicate particles hold water between layers, moisture exists in the air electrode 3 and fuel electrode 4 even under high temperature and low humidity, and hence the power-generating performance is not lowered. Furthermore, since the phyllosilicate particle has ion conductivity, the ion-exchange capacity in the air electrode 3 and fuel electrode 4 is never lowered in comparison with the case where the phyllosilicate particles are not added. For this reason, low humidification operation is possible for the solid polymer fuel cell 1 equipped with the air electrode 3 and fuel electrode 4 containing the phyllosilicate particles.

As the phyllosilicate particles, what is shown in Embodiment I is used. Although an average diameter of the phyllosilicate particles is about 2 μm or less, it is usually aggregated, and hence the aggregation diameter D is preferable that it is D≦100 μm. The power-generating performance falls if the aggregation diameter D is D>100 μm. In addition, as for the ion-exchange capacity Ic of the phyllosilicate particles, it is preferable that it is Ic≧0.5 meq/g. The power-generating performance falls if the ion-exchange capacity Ic of the phyllosilicate particles is Ic<0.5 meq/g. The upper limit of the ion-exchange capacity Ic of the phyllosilicate particles is Ic≈1.0 meq/g practically. It is preferable that the content L of the phyllosilicate particles in the air electrode 3 and fuel electrode 4 is L≦10% by weight. The power-generating performance falls if the content L of the phyllosilicate particles is L>10% by weight. In addition, the content L of the phyllosilicate particles is expressed in % by weight on the basis of the catalyst particles (catalyst metal particles+carrier particles). L is calculated by the equation: L=(Wb/Wa)×100 (%) where Wa is the weight of catalyst particles and Wb the weight of phyllosilicate particles. The lower limit of content L of phyllosilicate particles may be L≈0.01% by weight.

Each of the separators 7 and 8 is a metal plate which has many grooves 11 and 12 for gas channels formed at least in one side (usually both sides), and acts as a fixing member at the time of cells being stacked while separating each cell.

The following means is adopted in the production of the electrolyte membrane-electrode integrated-material.

(1) The catalyst particles are formed by making the carbon black particles support Pt particles. The slurry for electrodes is prepared by uniformly mixing catalyst particles and phyllosilicate particles in an organic solvent solution of an ion conductive binder (this may be the above-described polymer ion-exchange component). Those mentioned in Table 2 in Embodiment I are used as an organic solvent. In addition, it is preferable that a weight ratio of the catalyst particles to the polymer ion-exchange component in the slurry for electrodes is 1/2 to 3/1.

(2) The diffusion layers 5 and 6 comprising a supporting layer and a base layer are produced by applying the slurry, which is made by uniformly dispersing the carbon black particles and particles such as polytetrafluoroethylene (PTFE), whose weight ratio is 1/3 to 5/1, in a solvent such as ethylene glycol, to one side of the supporting layer (current collecting material) such as carbon paper, drying it to form the base layer. The film thickness of the base layer can be about 1.8 to 2.5 mg/cm².

(3) The air electrode 3 and fuel electrode 4 are produced by applying the slurry for electrodes, which is obtained in above-described item (1), on the base layers of diffusion layers 5 and 6, and drying it so that an amount of Pt may become 0.4 to 0.6 mg/cm$^2$.

(4) Hot press is performed with contacting one diffusion layer 5 to one face of the electrolyte membrane 2 through the air electrode 3 and contacting another diffusion layer 6 to another face through the fuel electrode 4. Preferable hot press conditions are 60 to 200° C. of temperature, 1 to 10 MPa of pressure, and 1 to 3 minutes. In addition, it is also good to perform two steps of hot press, and the conditions in a primary hot press can be 60 to 100° C. of temperature, 1 to 10 MPa of pressure, and 1 to 3 minutes, and the conditions in a secondary hot press can be 120 to 200° C. of temperature, 1 to 10 MPa of pressure, and 1 to 3 minutes.

In addition, when producing the above-described integrated-material, it is possible to perform hot press under the same conditions as the above-described ones after, for example, forming the air electrode 3 on one diffusion layer 5, subsequently, forming the electrolyte membrane 2 on a surface of the air electrode 3, furthermore forming the fuel electrode 4 in a surface of the electrolyte membrane 2, and thereafter stacking another diffusion layer 6 on a surface of the fuel electrode 4. In this case, in the organic solvent solution of the polymer ion-exchange component used for formation of the electrolyte membrane 2, its component concentration is 5 to 15% by weight, in addition, at the time of applying the solution, a survival amount of the organic solvent included in the air electrode 3 is 0.1 to 0.2 mg/cm$^2$, further, drying after the above-described solution application is performed until the survival amount of the organic solvent becomes 3 to 20% by weight, and preferably, 5 to 15% by weight, and the concentration of solid contents in the slurry for electrodes for forming the fuel electrode 4 is set at a comparatively small rate, that is, 5 to 20% by weight.

Hereafter, specific examples will be described.

EXAMPLE-1

(1) Catalyst particles were made by making carbon black (furnace black) particles support Pt particles so that a weight ratio of the Pt particles to the carbon black particles may become 1:1. In addition, sulfonated polyether ether ketone was obtained by putting polyether ether ketone (made by Aldrich) into fuming sulfuric acid to perform sulfonation until ion-exchange capacity became 2.4 meq/g. The sulfonated polyether ether ketone solution with 12% by weight of concentration was obtained by performing the reflux dissolution of the sulfonated polyether ether ketone in N-methyl pyrrolidone (made by Aldrich). Catalyst slurry where a weight ratio of catalyst particles to sulfonated polyether ether ketone was 1:2 was produced by mixing the catalyst particles in this sulfonated polyether ether ketone solution.

The slurry for electrodes was produced by dispersing phyllosilicate particles in N-methyl pyrrolidone, and adding the obtained slurry to the catalyst slurry. The content L of the phyllosilicate particles in the slurry for electrodes was 3% by weight to the catalyst particles.

(2) The diffusion layer comprising a carbon paper and a base layer was produced by applying the slurry, which is made by uniformly dispersing the carbon black particles and polytetrafluoroethylene (PTFE) particles, whose weight ratio is 4:6, in ethylene glycol, to one side of carbon paper, drying it to form the base layer.

(3) An air electrode 3 and a fuel electrode 4 were produced by applying the slurry for electrodes on the base layer of the diffusion layer so that an amount of Pt may become 0.5 mg/cm$^2$, drying it at 60° C. for 10 minutes, and performing drying under reduced pressure at 120° C.

(4) The electrolyte membrane with the thickness of 50 μm was produced by using the above-described sulfonated polyether ether ketone.

(5) An electrolyte membrane-electrode integrated-material was produced by sandwiching the electrolyte membrane between the air electrode and fuel electrode, performing the primary hot press under the conditions of 80° C., 5 MPa, and 2 minutes, and subsequently, performing the secondary hot press under the conditions of 160° C., 4 MPa, and 1 minute.

Figure 7:
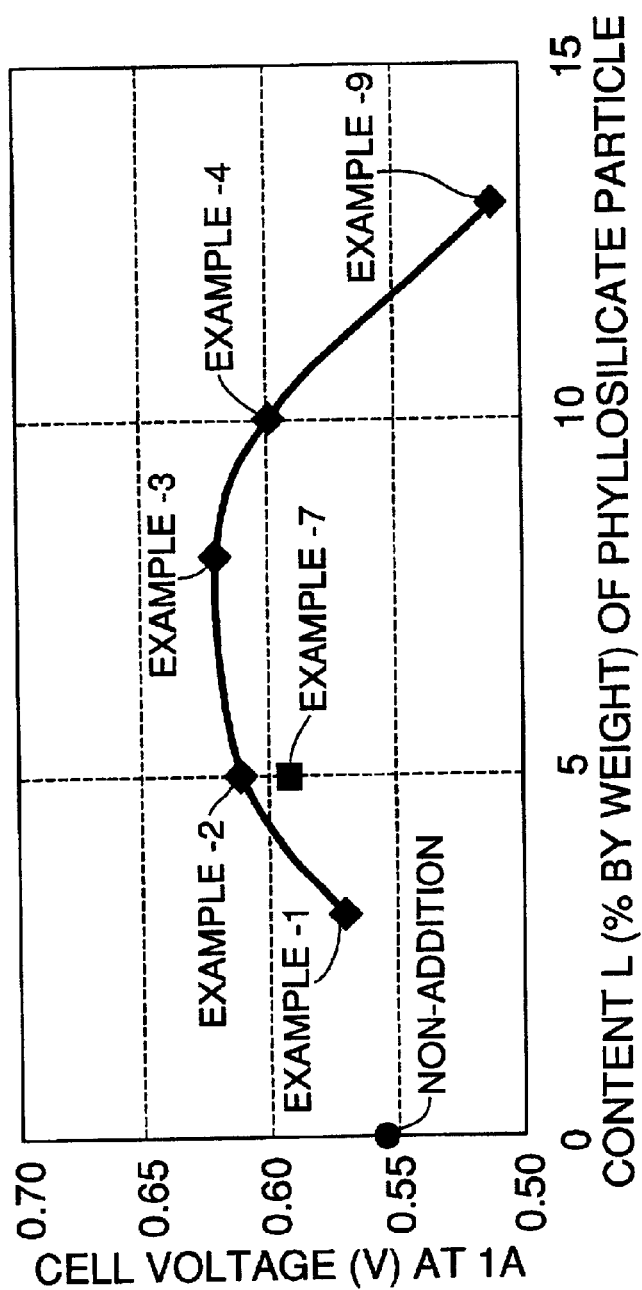
FIG. 7 is a graph showing the relationship between the content L of phyllosilicate particles and the power-generating performance (cell potential at 1 A)
Figure 8:
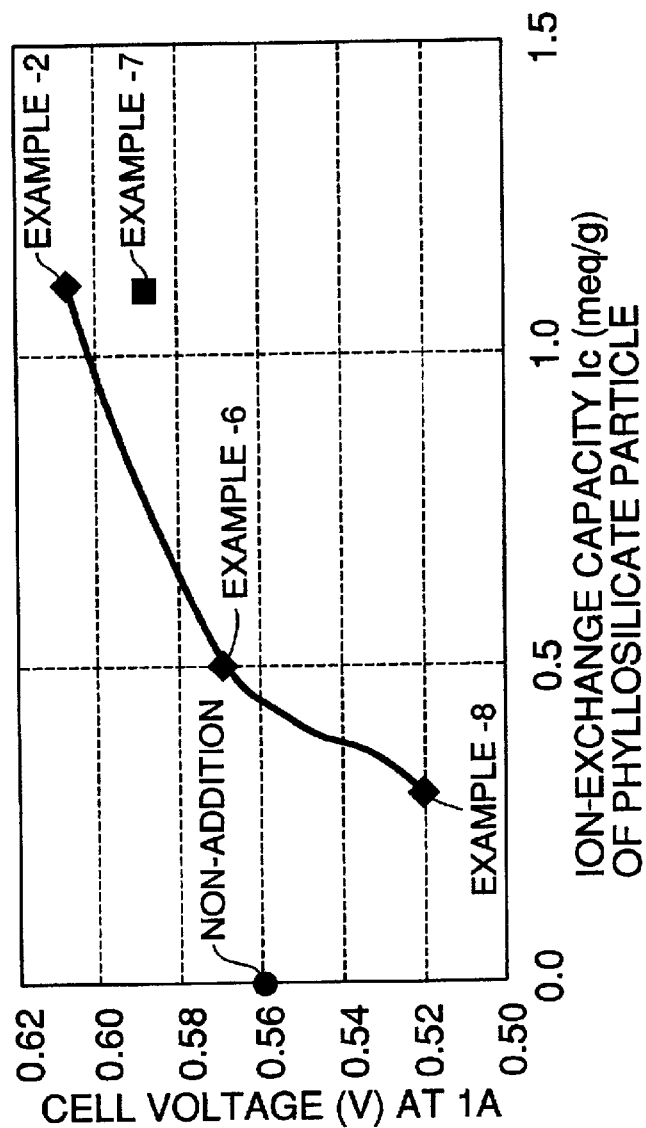
FIG. 8 is a graph showing the relationship between the ion-exchange capacity Ic of phyllosilicate particles and the power-generating performance (cell potential at 1 A)
Figure 9:
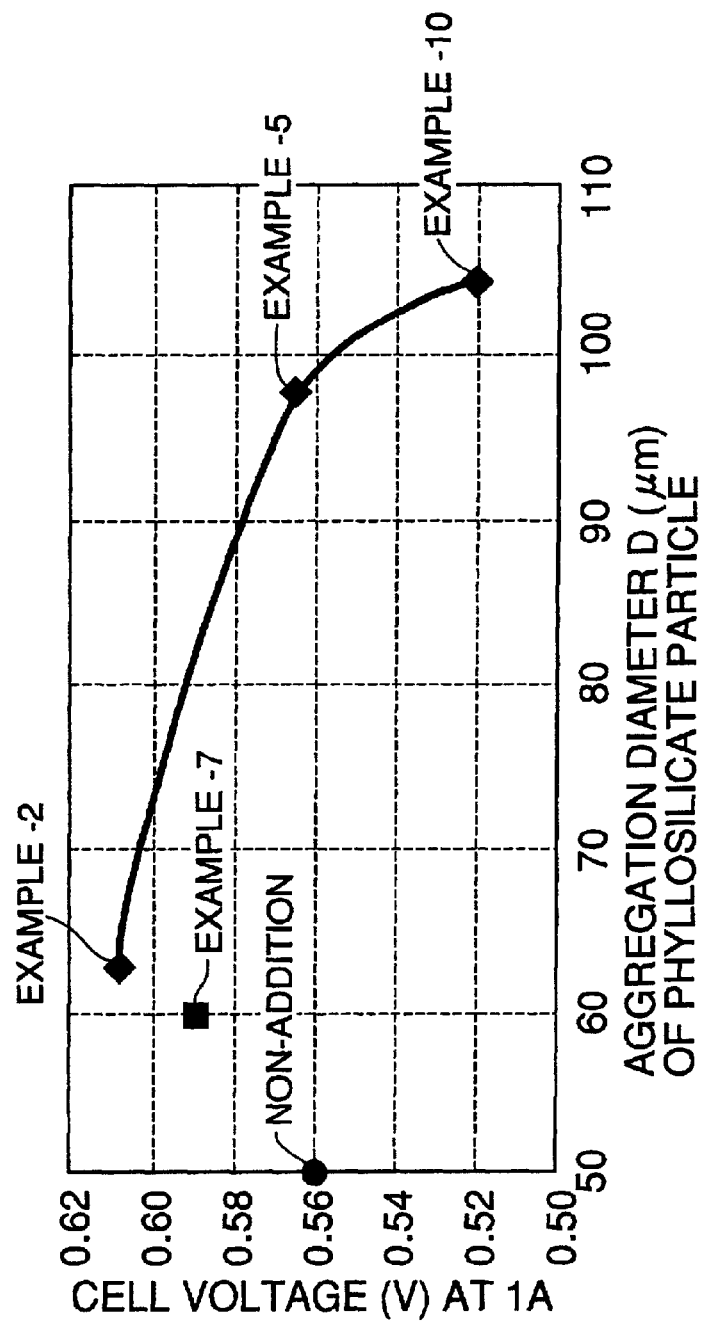
FIG. 9 is a graph showing the relationship between the aggregation diameter D of phyllosilicate particles and the power-generating performance (cell potential at 1 A).

(6) A cell stack was assembled with a usual method by using the above-described integrated-material. Power generation was performed by supplying pure hydrogen to the fuel electrode with supplying air to the air electrode. Power generation conditions in both the electrodes were 100 kPa of gas pressure, 50% of utilization ratio, and 80° C. of dew-point. Cell pressure was made to be atmospheric pressure. Humidification was indirect humidification by a cathode gas. Cell potential at the current density of 1 A/cm$^2$ was measured under these conditions. The result is shown in Table 5. In addition, FIG. 7 shows the relationship between the content L of phyllosilicate particles and the power-generating performance (cell potential at 1 A), FIG. 8 shows the relationship between the ion-exchange capacity Ic of phyllosilicate particles and the power-generating performance (cell potential at 1 A), and FIG. 9 shows the relationship between the aggregation diameter D of phyllosilicate particles and the power-generating performance (cell potential at 1 A).

EXAMPLE-2

The above-described integrated-material was produced by the same method as that in Example-1 except the content L of phyllosilicate particles being set at 5% by weight to the catalyst particles, and the power-generating performance was evaluated. The result is shown in Table 5 and FIGS. 7 to 9.

EXAMPLE-3

The above-described integrated-material was produced by the same method as that in Example-1 except the content L of phyllosilicate particles being set at 8% by weight to the catalyst particles, and the power-generating performance was evaluated. The result is shown in Table 5 and FIGS. 7 to 9.

EXAMPLE-4

The above-described integrated-material was produced by the same method as that in Example-1 except the content L of phyllosilicate particles being set at 10% by weight to the catalyst particles, and the power-generating performance was evaluated. The result is shown in Table 5 and FIGS. 7 to 9.

EXAMPLE-5

The above-described integrated-material was produced by the same method as that in Example-1 except the content L of phyllosilicate particles being set at 5% by weight to the catalyst particles, and the power-generating performance was evaluated. The result is shown in Table 5 and FIGS. 7 to 9.

EXAMPLE-6

The above-described integrated-material was produced by the same method as that in Example-2 except the phyllosilicate particles, whose ion-exchange capacity Ic and aggregation diameter D were different, being used, and the power-generating performance was evaluated. The result is shown in Table 5 and FIGS. 7 to 9.

EXAMPLE-7

The above-described integrated-material was produced by the same method as that in Example-2 except the catalyst particles, which support Pt, being not used, and the power-generating performance was evaluated. The result is shown in Table 5 and FIGS. 7 to 9.

EXAMPLE-8

The above-described integrated-material was produced by the same method as that in Example-2 except the phyllosilicate particles, whose ion-exchange capacity Ic and aggregation diameter D were different, being used, and the power-generating performance was evaluated. The result is shown in Table 5 and FIGS. 7 to 9.

EXAMPLE-9

The above-described integrated-material was produced by the same method as that in Example-1 except the content L of phyllosilicate particles, whose aggregation diameter D was different, being set at 13% by weight to the catalyst particles, and the power-generating performance was evaluated. The result is shown in Table 5 and FIGS. 7 to 9.

EXAMPLE-10

The above-described integrated-material was produced by the same method as that in Example-2 except the phyllosilicate particles, whose aggregation diameter D was different, being used, and the power-generating performance was evaluated. The result is shown in Table 5 and FIGS. 7 to 9.

TABLE 5

| | Pt Supporting Amount (% by weight) | Phyllosilicate Particle | | | Power-generating performance Cell Voltage (V) |
| --- | --- | --- | --- | --- | --- |
| | | Ion-exchange capacity Ic (meq/g) | Content L (% by weight) | Aggregation Diameter D ($\mu$m) | |
| Example-1 | 10 | 1.1 | 3 | 56 | 0.57 |
| Example-2 | 10 | 1.1 | 5 | 62 | 0.61 |
| Example-3 | 10 | 1.1 | 8 | 88 | 0.62 |
| Example-4 | 10 | 1.1 | 10 | 98 | 0.60 |
| Example-5 | 10 | 1.1 | 5 | 98 | 0.565 |
| Example-6 | 10 | 0.5 | 5 | 60 | 0.57 |
| Example-7 | 0 | 1.1 | 5 | 62 | 0.59 |
| Example-8 | 10 | 0.3 | 5 | 64 | 0.52 |
| Example-9 | 10 | 1.1 | 13 | 68 | 0.51 |
| Example-10 | 10 | 1.1 | 5 | 105 | 0.52 |

As apparent from FIG. 7, as the content L of the phyllosilicate particles increases, the cell voltage increases since water retention functions of the fuel electrode and air electrode are improved. However, if the content L of the phyllosilicate particles increases too much, since the phyllosilicate particle block the movement of protons, this proton movement-blocking action exceeds a water retention effect and hence, the power-generating performance is apt to decrease. Hence, the content L of the phyllosilicate particles is set at L$\leq$10% by weight.

In addition, as apparent from FIG. 8, as the ion-exchange capacity Ic of the phyllosilicate particles becomes large, the power-generating performance also improves. Hence, the ion-exchange capacity Ic of the phyllosilicate particles is set at Ic$\geq$0.5 meq/g.

Furthermore, as apparent from FIG. 9, as the aggregation diameter D of the phyllosilicate particles becomes large, the power-generating performance is lowered. Hence, the aggregation diameter D of the phyllosilicate particles is set at D$\leq$100 $\mu$m.

What is claimed is:

1. A solid polymer fuel cell, comprising:

an electrolyte membrane (2); and an air electrode (3) and a fuel electrode (4) which closely contact to opposite sides of the electrolyte membrane (2) respectively, characterized in that the electrolyte membrane (2) has a membrane core (9) comprising a polymer ion-exchange component, and a plurality of phyllosilicate particles (10) that disperse in the membrane core (9) and are subjected to ion-exchange processing between metal ions and protons, and that proton conductance Pc satisfies Pc>0.05 S/cm.

2. A solid polymer fuel cell according to claim 1, wherein particle sized of the phyllosilicate particle (10) satisfies 0.001 $\mu$m$\leq$d$\leq$2 $\mu$m and ion-exchange capacity Ic satisfies 0.5 meq/g$\leq$Ic$\leq$2.0 meq/g, and its particle content L satisfies L$\leq$10% by weight.

3. A solid polymer fuel cell, comprising: an electrolyte membrane (2); and an air electrode (3) and a fuel electrode (4) which closely contact to opposite sides of the electrolyte membrane (2) respectively, characterized in that the air electrode (3) and fuel electrode (4) have a plurality of catalytic particles, a polymer ion-exchange component, and a plurality of phyllosilicate particles.

4. A solid polymer fuel cell according to claim 3, wherein the phyllosilicate particles are at least either smectite mineral particles or synthetic mica particles.

5. A solid polymer fuel cell according to claim 4, wherein the smectite mineral particle is at least one kind selected from montmorillonite, saponite, hectorite, stevensite, and vermiculite, and the synthetic mica particle is at least either fluorotetrasilicic mica or teniolite.

6. A solid polymer fuel cell according to claim 3, 4, or 5, wherein content L of the phyllosilicate particles satisfies L$\leq$10% by weight.

7. A solid polymer fuel cell according to claim 3, 4 or 5, wherein ion-exchange capacity Ic of the phyllosilicate particles satisfies Ic$\geq$0.5 meq/g.

8. A solid polymer fuel cell according to claim 3, 4 or 5, wherein aggregation diameter D of the phyllosilicate particles satisfies D$\leq$100 $\mu$m.

* * * * *